(12) United States Patent
Grziwok et al.

(10) Patent No.: US 9,416,912 B2
(45) Date of Patent: Aug. 16, 2016

(54) WALL MOUNT WITH CONFIGURABLE STOPS

(71) Applicant: Lilitab LLC, San Rafael, CA (US)

(72) Inventors: Bryan Rudolf Grziwok, Berkeley, CA (US); Adam Scott Aronson, San Rafael, CA (US)

(73) Assignee: Lilitab LLC, San Rafael, CA (US)

( * ) Notice: Subject to any disclaimer, the term of this patent is extended or adjusted under 35 U.S.C. 154(b) by 21 days.

(21) Appl. No.: 14/211,496

(22) Filed: Mar. 14, 2014

(65) Prior Publication Data

US 2014/0265775 A1 Sep. 18, 2014

Related U.S. Application Data

(60) Provisional application No. 61/801,833, filed on Mar. 15, 2013.

(51) Int. Cl.

| F16M 11/08 | (2006.01) |
|---|---|
| F16M 11/04 | (2006.01) |
| F16M 11/06 | (2006.01) |
| A47B 96/06 | (2006.01) |
| F16M 11/20 | (2006.01) |
| F16M 13/00 | (2006.01) |
| F16M 13/02 | (2006.01) |
| A47F 5/08 | (2006.01) |

(52) U.S. Cl.
CPC ............... *F16M 11/08* (2013.01); *A47B 96/06* (2013.01); *F16M 11/04* (2013.01); *F16M 11/041* (2013.01); *F16M 11/06* (2013.01); *F16M 11/2014* (2013.01); *F16M 13/00* (2013.01); *F16M 13/02* (2013.01); *A47F 5/08* (2013.01)

(58) Field of Classification Search
CPC ....... F16M 11/08; F16M 11/04; F16M 11/06; Y10T 16/5513; Y10T 16/5518; Y10T 403/32557; Y10T 403/62591; Y10T 403/32591; A47B 96/06
USPC .......... 312/246, 248; 248/282.1, 425, 288.31, 248/289.11, 418, 299.1, 292.14, 297.21, 248/917–924, 278.1; D14/451, 452; D8/363

See application file for complete search history.

(56) References Cited

U.S. PATENT DOCUMENTS

| 1,007,590 A * | 10/1911 | Miller ....................... 248/289.11 |
| 2,083,140 A * | 6/1937 | Brantingson ................... 16/334 |

(Continued)

FOREIGN PATENT DOCUMENTS

FR 2499483 A1 * 8/1982

OTHER PUBLICATIONS http://armodilo.com/products/armotwist, Armodilo ArmoTwist, 2013, downloaded Sep. 25, 2013, 3 pages.

(Continued)

*Primary Examiner* — Eret McNichols
(74) *Attorney, Agent, or Firm* — Fish & Richardson P.C.

(57) ABSTRACT

One example of a wall mount with configurable stops to mount electronic equipment includes an enclosure housing to receive the electronic equipment and a pivot tube having a first end and a second end. The first end is attached to a rear external surface of the electronic housing. A stop plate is attached to the second end of the pivot tube. The stop plate is configured to be mounted to a surface. The stop plate includes multiple stops to control a range of rotation of the enclosure housing on the pivot tube.

18 Claims, 3 Drawing Sheets

(56) References Cited

U.S. PATENT DOCUMENTS

| | | | | |
|---|---|---|---|---|
| 2,463,410 | A * | 3/1949 | Morris | 5/640 |
| 3,423,057 | A * | 1/1969 | Iverson | 248/296.1 |
| 3,576,988 | A * | 5/1971 | Henning | 362/427 |
| 3,735,597 | A * | 5/1973 | Guy | 405/202 |
| 3,931,663 | A * | 1/1976 | Holmes et al. | 16/321 |
| 4,185,801 | A * | 1/1980 | Plymoth | 248/282.1 |
| 4,307,672 | A * | 12/1981 | Shikimi | 108/139 |
| 4,886,237 | A * | 12/1989 | Dennis | 248/289.11 |
| 4,948,083 | A * | 8/1990 | McNaney et al. | 248/514 |
| 5,335,970 | A * | 8/1994 | Bryant et al. | 297/344.22 |
| 5,732,922 | A * | 3/1998 | Jeon | 248/371 |
| 5,876,008 | A * | 3/1999 | Sweere et al. | 248/325 |
| 6,378,830 | B1 * | 4/2002 | Lu | 248/278.1 |
| 6,379,073 | B1 | 4/2002 | Yoo | |
| 6,601,811 | B1 * | 8/2003 | Van Lieshout | 248/282.1 |
| 6,729,592 | B1 * | 5/2004 | Kurtts | 248/278.1 |
| 7,000,878 | B2 * | 2/2006 | Lin | 248/276.1 |
| 7,028,961 | B1 * | 4/2006 | Dittmer et al. | 248/278.1 |
| 7,152,836 | B2 * | 12/2006 | Pfister et al. | 248/292.14 |
| 7,218,510 | B2 | 5/2007 | Hillman | |
| 7,316,377 | B2 | 1/2008 | Smed | |
| 7,395,996 | B2 * | 7/2008 | Dittmer | 248/291.1 |
| 7,398,950 | B2 * | 7/2008 | Hung | 248/276.1 |
| D580,743 | S * | 11/2008 | Short | D8/363 |
| 7,510,156 | B1 * | 3/2009 | Yaeger | 248/284.1 |
| 7,523,906 | B2 * | 4/2009 | Bennett | 248/288.51 |
| 7,694,922 | B2 | 4/2010 | Kim | |
| 7,738,245 | B1 * | 6/2010 | Stifal | 361/679.21 |
| 7,861,992 | B2 * | 1/2011 | Huang | 248/282.1 |
| 7,954,777 | B2 * | 6/2011 | Bohm et al. | 248/278.1 |
| 7,984,888 | B2 * | 7/2011 | Park | 248/281.11 |
| 8,094,438 | B2 * | 1/2012 | Dittmer et al. | 361/679.01 |
| 8,100,372 | B2 * | 1/2012 | Vlies | 248/220.1 |
| 8,245,990 | B2 * | 8/2012 | Huang | 248/276.1 |
| 8,282,052 | B2 * | 10/2012 | Huang | 248/125.1 |
| 8,701,953 | B2 * | 4/2014 | Bopp et al. | 224/547 |
| 8,888,062 | B2 * | 11/2014 | Novin | 248/281.11 |
| 2004/0262474 | A1 * | 12/2004 | Boks et al. | 248/276.1 |
| 2005/0230585 | A1 * | 10/2005 | Hung | 248/278.1 |
| 2006/0186294 | A1 * | 8/2006 | Van Groesen et al. | 248/284.1 |
| 2006/0261228 | A1 * | 11/2006 | Hung | 248/282.1 |
| 2007/0040084 | A1 * | 2/2007 | Sturman et al. | 248/280.11 |
| 2007/0102603 | A1 * | 5/2007 | Newell | 248/219.2 |
| 2007/0258753 | A1 * | 11/2007 | Chen et al. | 403/91 |
| 2007/0275629 | A1 * | 11/2007 | Tseng | 445/71 |
| 2009/0072108 | A1 * | 3/2009 | Oleson | 248/282.1 |
| 2010/0065705 | A1 * | 3/2010 | Brown et al. | 248/288.11 |
| 2012/0037776 | A1 * | 2/2012 | Hung | 248/282.1 |
| 2012/0061542 | A1 | 3/2012 | Bostater | |
| 2013/0026322 | A1 | 1/2013 | Wheeler | |
| 2013/0082156 | A1 * | 4/2013 | Conner | 248/281.11 |
| 2013/0327912 | A1 * | 12/2013 | Yoshida et al. | 248/289.11 |
| 2014/0247612 | A1 * | 9/2014 | Hochman | 362/427 |
| 2015/0144758 | A1 * | 5/2015 | Kolokotronis | 248/282.1 |

OTHER PUBLICATIONS http://www.ipadenclosures.com/ipad_kiosk_enclosure/ipad_table_mounts_stands/axis-ipad-table-mount, iPad Enclosures LLC, Axis iPad Mount, 2013, downloaded Sep. 25, 2013, 4 pages.

* cited by examiner

WALL MOUNT WITH CONFIGURABLE STOPS

CROSS REFERENCE TO RELATED APPLICATIONS

This disclosure claims the benefit of the priority of U.S. Provisional Application Ser. No. 61/801,833, filed Mar. 15, 2013, and entitled "Wall Mount with Configurable Stops", which is incorporated herein by reference in its entirety.

TECHNICAL FIELD

This disclosure relates to a pivotable wall mount that provides a controllable range of motion.

BACKGROUND

An electronic device, such as a computer, control panel, or tablet computer, can be presented for public use. To do so, the device can be housed in an enclosure and mounted on a support. This enclosure can have several attributes useful when deployed in a public, unsupervised location. These attributes include physical robustness (to resist damage), tamper and theft-resistance, resistance to ingress of water and/or contaminants, etc. An enclosure which possesses such attributes can be called a "secure enclosure". A secure enclosure which is deployed in a public location can be called a "kiosk".

Such equipment, when deployed by users in public places and places of business, can offer different mounting and articulation features. An example feature can include an ability to mount the enclosure to a vertical surface, such as a wall or façade. Such a mount can be called a "wall mount". An enclosure which is attached to a wall mount can be said to be "wall-mounted".

SUMMARY

This disclosure relates to a pivotable wall mount that incorporates multiple configurable plates that can control a range of motion of the wall mount.

The plates contain bumpers which constrain the limits between which the wall mount can pivot. When the mount is installed, or at a later time, the user can select a plate that corresponds to the desired range of motion. The plate and mount are specifically designed to include a passage for a cable. Details of one or more implementations of the subject matter described in this specification are set forth in the accompanying drawings and the description below. Other features, aspects, and potential advantages will become apparent from the description, the drawings, and the claims.

DETAILED DESCRIPTION

This disclosure relates to a mounting system designed for use with electronic devices (in general) and tablet computers (specifically). The mounting system includes a member that pivots about a vertical axis, for example, an axis that is substantially parallel to a surface on which the member is mounted. This pivoting can be constrained by the use of a stop plate. The mounting system includes multiple stop plates, which can be selected according to a desired range of motion for a given installation. To control a range of motion, each stop plate contains bumpers (or protrusions) that constrain the limits between which the member mounted to the stop plate can pivot. When the mount is being installed, for example, when the stop plate is being affixed to a surface to mount the member on the stop plate, or at a later time, the user can select a stop plate that corresponds to the desired range of motion. The stop plate and mount are specifically designed to include a passage for a cable.

In some implementations, the wall-mounted enclosure can be pivoted from side to side, for example, about an axis perpendicular to the floor. This action allows a user to point the mount in a direction where they want to sit or stand, rather than having to sit or stand in front of the mount. An example of where this is useful is in a kitchen, where a cook wants to refer to a recipe while standing in a certain place at the counter.

To control such pivoting, the stop plate can include stops (or bumpers or protrusions, described with reference to FIG. 4) that can limit a range of a rotation of a member disposed between the protrusions. In some instances, the stop plate selected can include protrusions that are sized to prevent the enclosure from striking a wall on which the enclosure is mounted when a user swivels the enclosure from one side to another. The location of such stops can vary depending on the size of the secure enclosure and the shape of the wall. A large enclosure, for example, may strike the wall after only a small angle of rotation, while a small enclosure could travel through a greater angle of rotation before striking the same wall. Further, where an enclosure is mounted at a corner, a stop plate having no protrusions or very small protrusions can be selected so that the mount has a full 180 degree range of movement.

The wall mount system described with reference to the following figures includes configurable stops to facilitate installation of the mount with the needed stops and the desired range of rotation. The stops are configured through the use of an interchangeable plate which is selected from a plurality of available plates at the time of installation.

Figure 1:
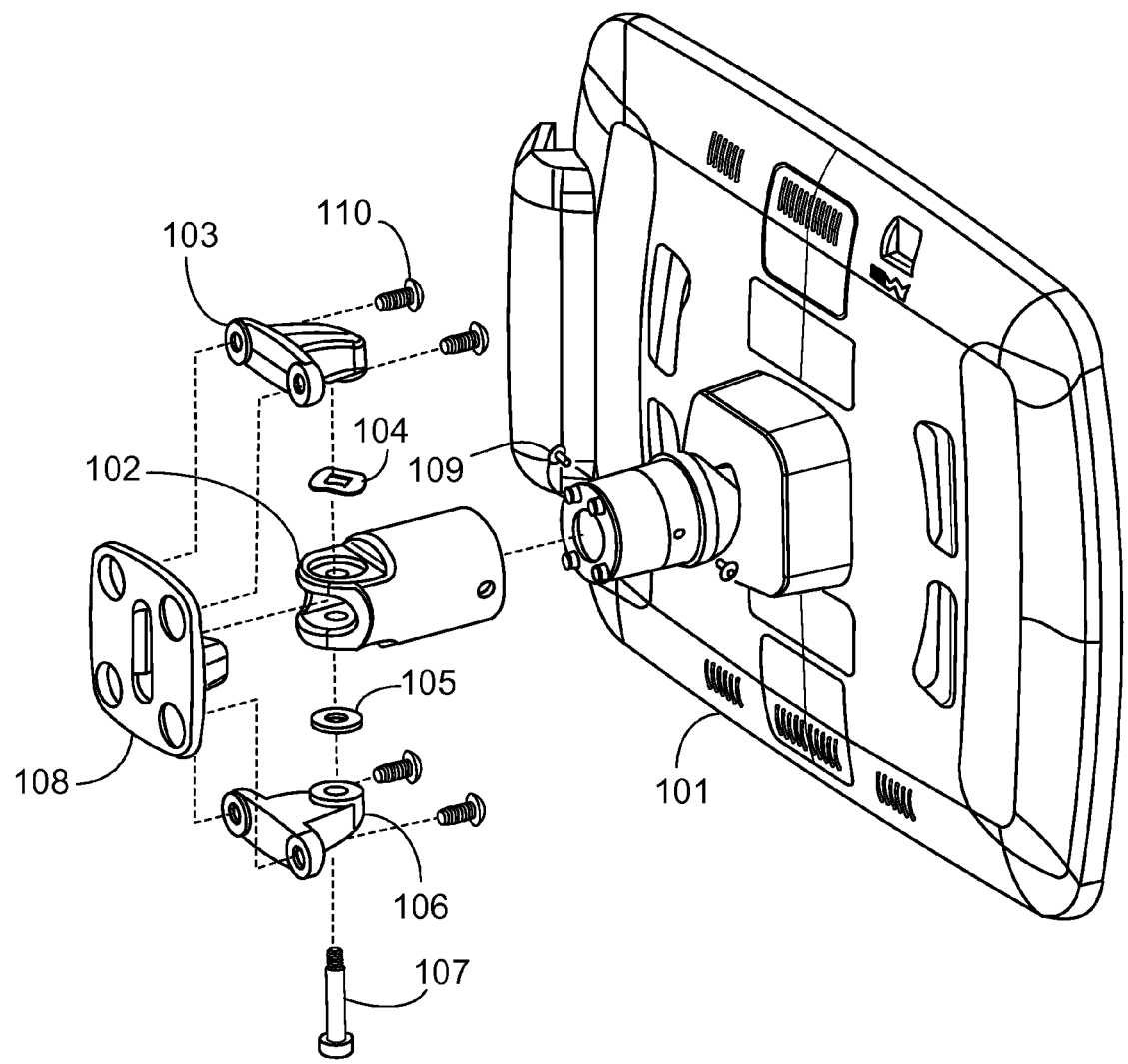
FIG. 1 illustrates the assembly of the pivotable wall mount which is part of the disclosed system.

FIG. 1 illustrates the assembly of the pivot system. A shoulder bolt 107 is passed through a lower bracket 106, a bushing 105, a pivot tube 102, a wave washer 104, and is threaded into an upper bracket 103. This forms the structural and functional assembly of the mount. The mount is then attached to the wall (or other surface) using screws 110 which pass through the upper bracket 103 and lower bracket 106, capturing the stop plate 108. The secure enclosure 101 is attached to the pivot tube 102 with two security screws 109. Alternatively this attachment may be made by other methods, such as riveting or welding. The stop plate 108 may be removed and exchanged with a different stop plate by removing the screws 110, removing the stop plate 108 and putting in its place, a different one. See FIG. 4 for an illustration of example stop plates.

Figure 2:
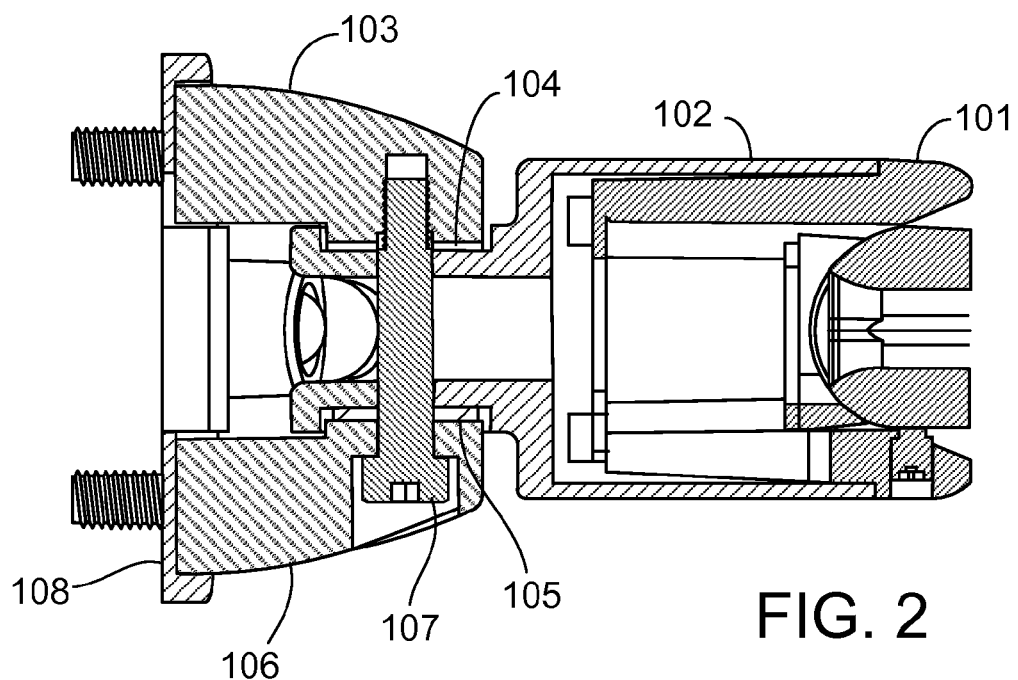
FIG. 2 shows a cross section through the axis of rotation of the pivotable wall mount.

FIG. 2 shows a cross section through the axis of rotation of the pivotable wall mount. The section shows the shoulder bolt 107 in its assembled position. The shoulder bolt 107 passes through the lower bracket 106, the bushing 105, the pivot tube 102, the wave washer 104, and threads into the upper bracket 103. When the shoulder bolt 107 is tightened, the wave washer 104 compresses, removing any looseness in the joint and creating some useful stiffness in the joint. The stiffness is useful in that it prevents the joint from moving too easily, for example when the electronic device being supported by the mount incorporates a touch screen display that is being pressed on during use.

Figure 3:
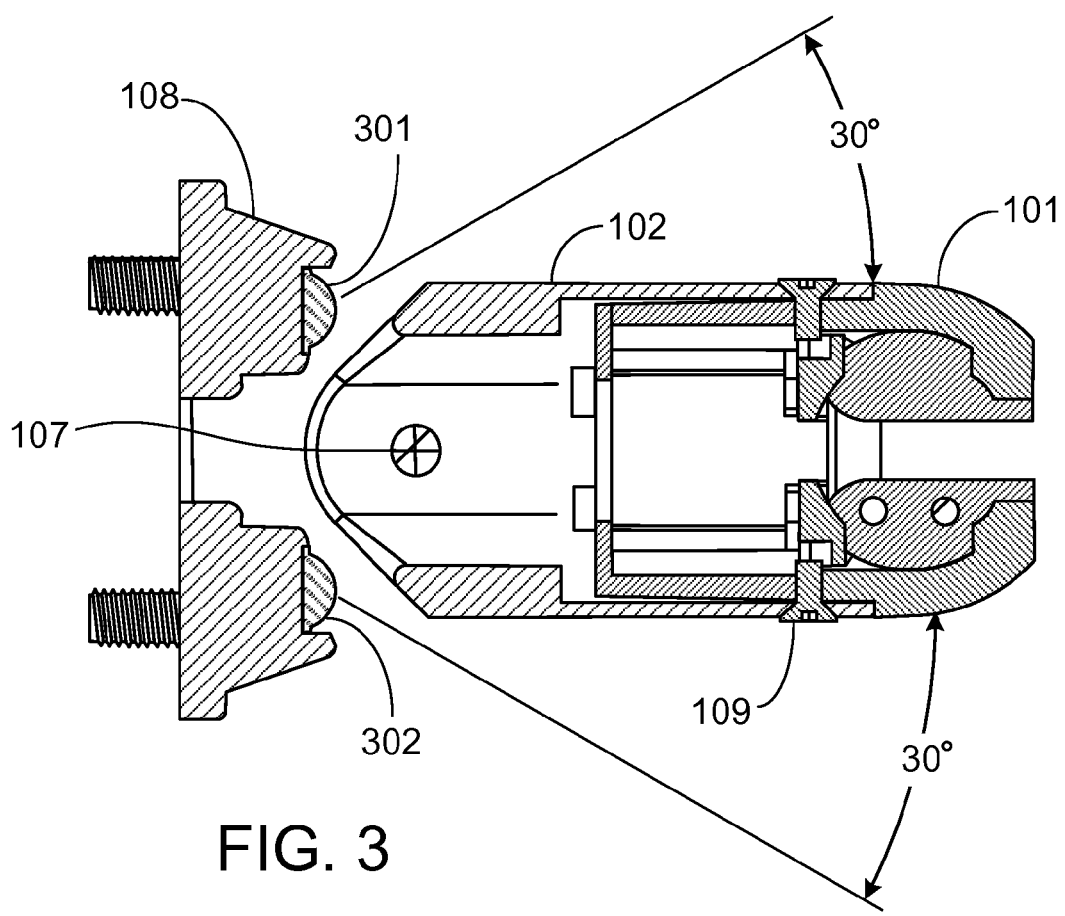
FIG. 3 shows a transverse cross-section through the pivotable wall mount, showing the stops which define the range of pivoting motion.

FIG. 3 shows a transverse cross-section through the pivotable wall mount, showing the stops which define the range of pivoting motion. Pivot tube 102 pivots about shoulder screw 107. The range of pivoting motion is determined by the position of bump stop 301 and bump stop 302. These stops may be made of elastomeric material to soften and quiet impact when the pivot tube 102 is moved to either end of its range of motion. The bump stops 301 and 302 are adhesively bonded to the stop plate 108. The dashed outlines show the position of the pivot tube 102 as it reaches the limits of motion in either direction. When the pivot tube 102 reaches the limit of its motion in the counter-clockwise direction, it contacts bump stop 301 at Location A. Bump stop 301 is supported on a protrusion on stop plate 108, the height of which determines the angle at which pivot tube 102 strikes the bump stop 301. When the pivot tube 102 reaches the limit of its motion in the clockwise direction, it contacts bump stop 302 at Location B. Bump stop 302 is supported on a protrusion on stop plate 108, the height of which determines the angle at which pivot tube 102 strikes the bump stop 302. The height of each protrusion—that beneath bump stop 301 and that beneath bump stop 302—can be independently varied to create any desired combination of clockwise and counter-clockwise pivot stops. The clockwise stop can have a different angular position than the counter-clockwise stop. The clockwise and counter-clockwise rotation limits can be reversed by inverting the stop plate 108.

Figure 4:
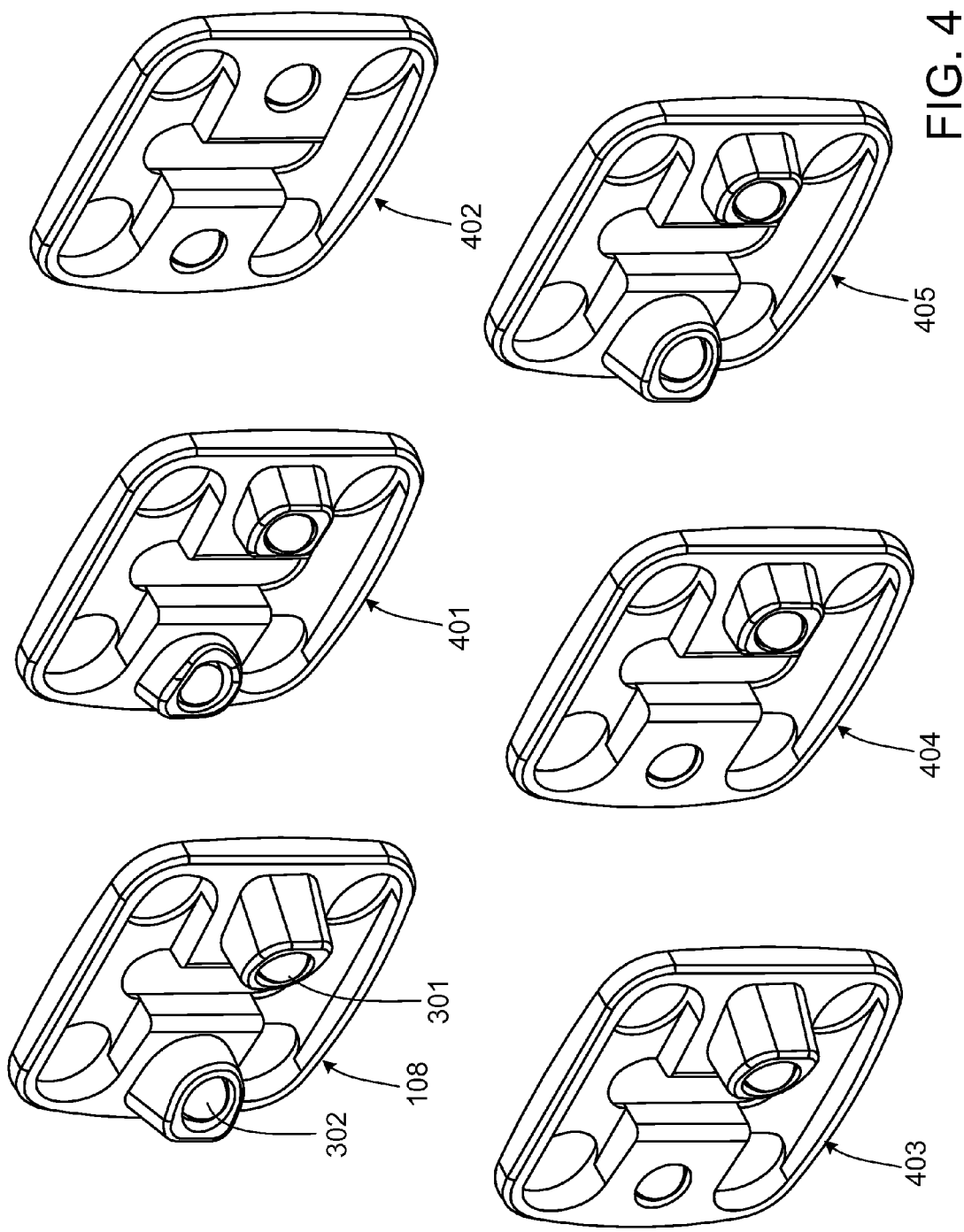
FIG. 4 shows a variety of example stop plates which can be used to set the desired range of movement.

FIG. 4 shows a variety of example stop plates which can be used to set the desired range of movement. Stop plate 108 allows rotation of 30 degrees in one direction and 30 degrees in the other, for a total included range of 60 degrees. Stop plate 401 allows rotation of 60 degrees in one direction and 60 degrees in the other, for a total included range of 120 degrees. Stop plate 402 allows rotation of 90 degrees in one direction and 90 degrees in the other, for a total included range of 180 degrees. Stop plate 403 allows rotation of 90 degrees in one direction and 30 degrees in the other, for a total included range of 120 degrees. Stop plate 404 allows rotation of 90 degrees in one direction and 90 degrees in the other, for a total included range of 150 degrees. Stop plate 405 allows rotation of 30 degrees in one direction and 60 degrees in the other, for a total included range of 90 degrees. Stop plates 403, 404, and 405 are examples of asymmetric stop plates, in that they have a different range of motion in each direction. In such cases, symmetry in the mounting pattern of the plate allows it to be rotated during installation to select the direction (clockwise or counter-clockwise) of greater/lesser angular range of movement.

Certain aspects of the subject matter described here can be implemented as a wall mount system for which the range of motion can be determined by selection from multiple available stop plates at the time of installation. The wall mount system can incorporate openings for passage of one or more cables. The wall mount system can include multiple stop plates, including those allowing both symmetric and asymmetric ranges of motion. A stop plate can be implemented as an interchangeable stop plate which is a user-configurable part of the wall mounting system for secure enclosures. The wall mount combined with the interchangeable stop plates can be implemented as part of a secure kiosk system. Certain aspects of the subject matter described here can be implemented as a wall mount system including a stop plate that has a first protrusion having a first height and a second protrusion having a second height (which may be the same or different from the first height), a pivot tube disposed to swivel about an axis, and a housing attached to the pivot tube to swivel about the axis between the first protrusion and the second protrusion. Certain aspects of the subject matter described here can be implemented as a wall mount kit including multiple stop plates, each stop plate including a first protrusion and a second protrusion on a surface of the stop plate, wherein heights of the first and second protrusion on each stop plate may vary. On each stop plate, the first protrusion will have a first height and a second protrusion will have a second height, which may be the same or different from the first height. The kit includes a pivot tube adapted to attach to each stop plate and to swivel about an axis substantially perpendicular to the surface on each stop plate. The kit includes a housing adapted to attach to the pivot tube to swivel about the axis between a first protrusion and a second protrusion. From this kit, a user can select and utilize a stop plate with desired protrusion heights at the time of installation.

A number of implementations have been described. Nevertheless, it will be understood that various modifications can be made without departing from the spirit and scope of the various inventions described herein.

What is claimed is:

1. A wall mount system to mount electronic equipment, the wall mount system comprising:
   an enclosure housing to receive the electronic equipment;
   a pivot tube having a first end and a second end, the first end attached to a rear external surface of the electronic housing;
   a stop plate rotatably attached to the pivot tube, the stop plate configured to be mounted to a surface, the stop plate including a plurality of stops to control a range of rotation of the enclosure housing on the pivot tube;
   an upper bracket attached to the stop plate and to an upper portion of the second end of the pivot tube; and
   a lower bracket attached to the stop plate and to a lower portion of the second end of the pivot tube, wherein the upper bracket and the lower bracket are configured to capture the stop plate.

2. The system of claim 1, further comprising a shoulder bolt passed through the upper bracket, the pivot tube and the lower bracket.

3. The system of claim 2, further comprising a wave washer positioned between the upper bracket and the pivot tube, wherein the wave washer is configured to compress in response to the shoulder bolt being turned.

4. The system of claim 1, wherein the pivot tube is attached to the enclosure housing by at least one of screwing, riveting or welding.

5. The system of claim 1, wherein the stop plate is a first stop plate and the plurality of stops is a first plurality of stops, wherein the system comprises a plurality of stop plates including the first stop plate, each stop plate configured to be interchangeably captured to the upper bracket and the lower bracket, each stop plate including a respective plurality of stops to control the range of rotation of the enclosure housing on the pivot tube, wherein a range of rotation defined by a second plurality of stops included in a second stop plate of the plurality of stop plates is different from the range of rotation defined by the first plurality of stops included in the first stop plate.

6. The system of claim 1, wherein the plurality of stops are adhesively bonded to the stop plate.

7. The system of claim 1, wherein the plurality of stops are made of elastomeric material.

8. The system of claim 1, wherein the plurality of stops are supported on a protrusion on the stop plate, wherein a height of the protrusion determines the range of pivoting motion of the pivot tube.

9. The system of claim 1, wherein the stop plate includes a plurality of protrusions, wherein each stop is positioned on a respective protrusion.

10. The system of claim 1, wherein the plurality of stops are arranged on the stop plate to allow different ranges of pivoting motion in the clockwise or the counter-clockwise direction.

11. The system of claim 10, wherein the range of rotation in the clockwise direction is at least one of 30 degrees, 60 degrees, 90 degrees.

12. The system of claim 10, wherein the range of rotation in the counter-clockwise direction is at least one of 30 degrees, 60 degrees, 90 degrees.

13. A wall mount system to mount electronic equipment, the wall mount system comprising:
 an enclosure housing to receive the electronic equipment;
 a pivot tube having a first end and a second end, the first end attached to a rear external surface of the electronic housing;
 an upper bracket attached to an upper portion of the second end of the pivot tube;
 a lower bracket attached to a lower portion of the second end of the pivot tube;
 a stop plate captured by the upper bracket and the lower bracket, the stop plate including a plurality of stops to control a range of rotation of the enclosure housing on the pivot tube;
 a shoulder bolt passed through the upper bracket, the pivot tube and the lower bracket; and
 a wave washer positioned between the upper bracket and the pivot tube, wherein the wave washer is configured to compress in response to the shoulder bolt being turned.

14. The system of claim 13, wherein the pivot tube is configured to pivot about the shoulder bolt between the plurality of stops on the stop plate.

15. The system of claim 13, wherein the stop plate is a first stop plate, wherein the plurality of stops is a first plurality of stops, wherein the system comprises a plurality of stop plates including the first stop plate, each stop plate configured to be interchangeably captured to the upper bracket and the lower bracket, each stop plate including a respective plurality of stops to control the range of rotation of the enclosure housing on the pivot tube, wherein a range of rotation defined by a second plurality of stops included in a second stop plate of the plurality of stop plates is different from the range of rotation defined by the first plurality of stops included in the first stop plate.

16. A wall mount system to mount electronic equipment, the wall mount system comprising:
 an enclosure housing to receive the electronic equipment;
 a pivot tube having a first end and a second end, the first end attached to a rear external surface of the electronic housing;
 an upper bracket attached to the second end of the pivot tube;
 a lower bracket attached to the second end of the pivot tube;
 a stop plate captured by the upper bracket and the lower bracket, the stop plate including a plurality of stops to control a range of rotation of the enclosure housing on the pivot tube; and
 a shoulder bolt passed through the upper bracket, the pivot tube and the lower bracket, wherein the pivot tube rotates about the shoulder bolt between the plurality of stops.

17. The system of claim 16, wherein the stop plate is a first stop plate, wherein the system comprises a plurality of stop plates including the first stop plate, each stop plate configured to be interchangeably captured to the upper bracket and the lower bracket.

18. The system of claim 17, wherein the plurality of stops is a first plurality of stops, each stop plate including a respective plurality of stops to control the range of rotation of the enclosure housing on the pivot tube, wherein a range of rotation defined by a second plurality of stops included in a second stop plate of the plurality of stop plates is different from the range of rotation defined by the first plurality of stops included in the first stop plate.

* * * * *